US012373992B2

(12) United States Patent
Jiang et al.

(10) Patent No.: US 12,373,992 B2
(45) Date of Patent: Jul. 29, 2025

(54) ADAPTIVE NEURAL IMAGE COMPRESSION WITH SMOOTH QUALITY CONTROL BY META-LEARNING

(71) Applicant: TENCENT AMERICA LLC, Palo Alto, CA (US)

(72) Inventors: Wei Jiang, Sunnyvale, CA (US); Wei Wang, Palo Alto, CA (US); Xiaozhong Xu, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 695 days.

(21) Appl. No.: 17/703,527

(22) Filed: Mar. 24, 2022

(65) Prior Publication Data

US 2022/0335656 A1    Oct. 20, 2022

Related U.S. Application Data

(60) Provisional application No. 63/174,927, filed on Apr. 14, 2021.

(51) Int. Cl.
*G06T 9/00* (2006.01)
*G06T 3/4046* (2024.01)

(52) U.S. Cl.
CPC ............ *G06T 9/002* (2013.01); *G06T 3/4046* (2013.01)

(58) Field of Classification Search
CPC ........................... G06T 9/002; G06T 3/44046
See application file for complete search history.

(56) References Cited

U.S. PATENT DOCUMENTS

| | | | |
|---|---|---|---|
| 9,053,431 B1 | 6/2015 | Commons | |
| 2009/0003708 A1 | 1/2009 | Steinberg et al. | |
| 2010/0124274 A1 | 5/2010 | Cheok et al. | |
| 2018/0173994 A1* | 6/2018 | Rippel | G06V 30/19173 |
| 2019/0122411 A1* | 4/2019 | Sachs | G06T 7/90 |
| 2019/0311694 A1* | 10/2019 | Van Mourik | H04N 9/67 |
| 2019/0364259 A1* | 11/2019 | Chen | H04N 21/23412 |
| 2020/0021847 A1* | 1/2020 | Kim | H04N 19/597 |
| 2020/0104976 A1* | 4/2020 | Mammou | G06T 9/00 |
| 2020/0105024 A1* | 4/2020 | Mammou | G06T 9/001 |
| 2020/0107032 A1* | 4/2020 | Ivanovic | H04N 19/119 |
| 2020/0111237 A1* | 4/2020 | Tourapis | G06T 9/001 |
| 2020/0280739 A1* | 9/2020 | Fitzgerald | G06F 3/015 |
| 2020/0314435 A1* | 10/2020 | Tourapis | G06T 7/74 |
| 2021/0105493 A1* | 4/2021 | Mammou | H04N 19/20 |

(Continued)

OTHER PUBLICATIONS

International Search Report issued Jul. 20, 2022 in International Application No. PCT/US2022/021963.

(Continued)

*Primary Examiner* — Kevin Ky
(74) *Attorney, Agent, or Firm* — Sughrue Mion, PLLC

(57) ABSTRACT

A method and apparatus for adaptive neural image compression with smooth quality control by meta-learning includes receiving an input image and a target quality control parameter; generating quality-adaptive weight parameters of an encoding neural network using shared encoding parameters and adaptive encoding parameters; and encoding the input image, based on the target quality control parameter, using the encoding neural network with the quality-adaptive weight parameters, to generate a compressed representation.

17 Claims, 10 Drawing Sheets

(56) References Cited

U.S. PATENT DOCUMENTS

2022/0335656 A1* 10/2022 Jiang .................... H04N 19/154
2024/0378752 A1* 11/2024 Westcott .................. G06T 7/50
2024/0404174 A1* 12/2024 Li .......................... G06V 10/82

OTHER PUBLICATIONS

Written Opinion of the International Searching Authority issued Jul. 20, 2022 in International Application No. PCT/US2022/021963.
Campos et al., "Content Adaptive Optimization for Neural Image Compression", arXiv, 2019, https://arXiv.org/abs/1906.01223 (5 pages total).
Zou et al., "L$^2$C—Learning to Learn to Compress", IEEE 22nd International Workshop on Multimedia Signal Processing (MMSP), 2020, https://arxiv.org/abs/2007.16054v1 (6 pages total).
Covell et al., "Target-Quality Image Compression with Recurrent, Convolutional Neural Networks" arXiv, 2017, https://arxiv.org/abs/1705.06687 (5 pages total).
Fallah et al., "Personalized Federated Learning with Theoretical Guarantees: A Model-Agnostic Meta-Learning Approach", Advances in Neural Information Processing Systems 33, 2020, pp. 1-12 (12 pages total).
Jiang et al., "Online Meta Adaptation for Variable-Rate Learned Image Compression", Proceedings of the IEEE/CVF Conference on Computer Vision and Pattern Recognition, 2022, https://arxiv.org/abs/2111.08256 (14 pages total).
Extended European Search Report issued Jul. 5, 2023, in Application No. 22761038.3.

\* cited by examiner

ADAPTIVE NEURAL IMAGE COMPRESSION WITH SMOOTH QUALITY CONTROL BY META-LEARNING

CROSS-REFERENCE TO RELATED APPLICATION

This application is based on and claims priority to U.S. Provisional Patent Application No. 63/174,927, filed on Apr. 14, 2021, the disclosure of which is incorporated by reference herein in its entirety.

BACKGROUND

ISO/IEC MPEG (JTC 1/SC 29/WG 11) has been actively searching for potential needs for standardization of future video coding technology. ISO/IEC JPEG has established the JPEG-AI group focusing on AI-based end-to-end. Neural Image Compression (NIC) using Neural Networks (NN). The success of recent approaches has brought more and more industrial interests in advanced neural image and video compression methodologies.

Although previous approaches have shown promising performance, flexible bitrate control remains a challenging issue for previous NIC methods. Conventionally, it may require training multiple model instances targeting each desired trade-off between a rate and a distortion (a quality of compressed images) individually. All these multiple model instances may be stored and deployed on a decoder side to reconstruct images from different bitrates. Also, these model instances cannot give arbitrary smooth bitrate control, because it is difficult to train and store an infinite number of model instances for every possible target bitrate. Previous approaches have studied multi-rate NIC in which one model instance is trained to achieve compression of multiple pre-defined bitrates. However, arbitrary smooth bitrate control remains an unexplored open issue.

SUMMARY

According to embodiments, a method for adaptive neural image compression with smooth quality control by meta-learning is provided. The method, being performed by at least one processor includes receiving an input image and a target quality control parameter; and encoding the input image, based on the target quality control parameter, using an encoding neural network with quality-adaptive weight parameters, to generate a compressed representation, wherein the quality-adaptive weight parameters are computed using shared encoding parameters and adaptive encoding parameters.

According to embodiments, an apparatus for adaptive neural image compression with smooth quality control by meta-learning is provided. The apparatus includes at least one memory configured to store program code; and at least one processor configured to read the program code and operate as instructed by the program code. The program code includes first receiving code configured to cause the at least one processor to receive an input image and a target quality control parameter; and first encoding code configured to cause the at least one processor to encode the input image, based on the target quality control parameter, using an encoding neural network with quality-adaptive weight parameters, to generate a compressed representation, wherein the quality-adaptive weight parameters are computed using shared encoding parameters and adaptive encoding parameters.

According to embodiments, a non-transitory computer-readable medium that stores instructions for adaptive neural image compression with smooth quality control by meta-learning is provided. The instructions, when executed by at least one processor, cause the at least one processor to receive an input image and a target quality control parameter; and encode the input image, based on the target quality control parameter, using an encoding neural network with quality-adaptive weight parameters, to generate a compressed representation, wherein the quality-adaptive weight parameters are computed using shared encoding parameters and adaptive encoding parameters.

DETAILED DESCRIPTION

The disclosure describes methods and apparatuses for a Meta Neural Image Compression (meta-NIC) framework for arbitrary smooth quality control in NIC. A meta learning mechanism can be used to adaptively compute quality-adaptive weight parameters of an underlying NIC model based on a current input image and a target quality indicator, so that a single meta-NIC model instance can achieve image compression with arbitrary smooth target qualities.

Figure 1:
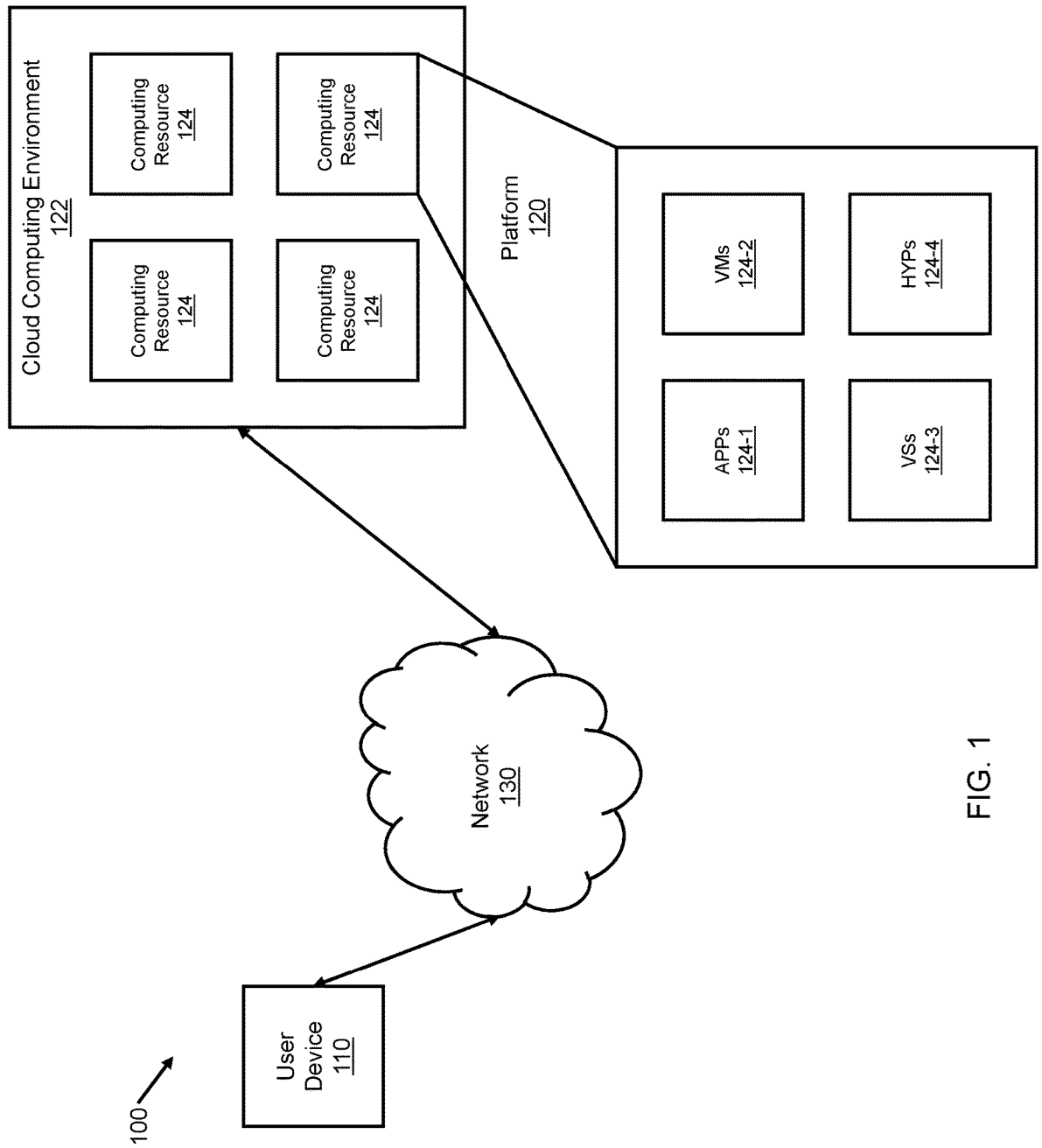
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 may include a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 may include one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 may include a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 may include one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
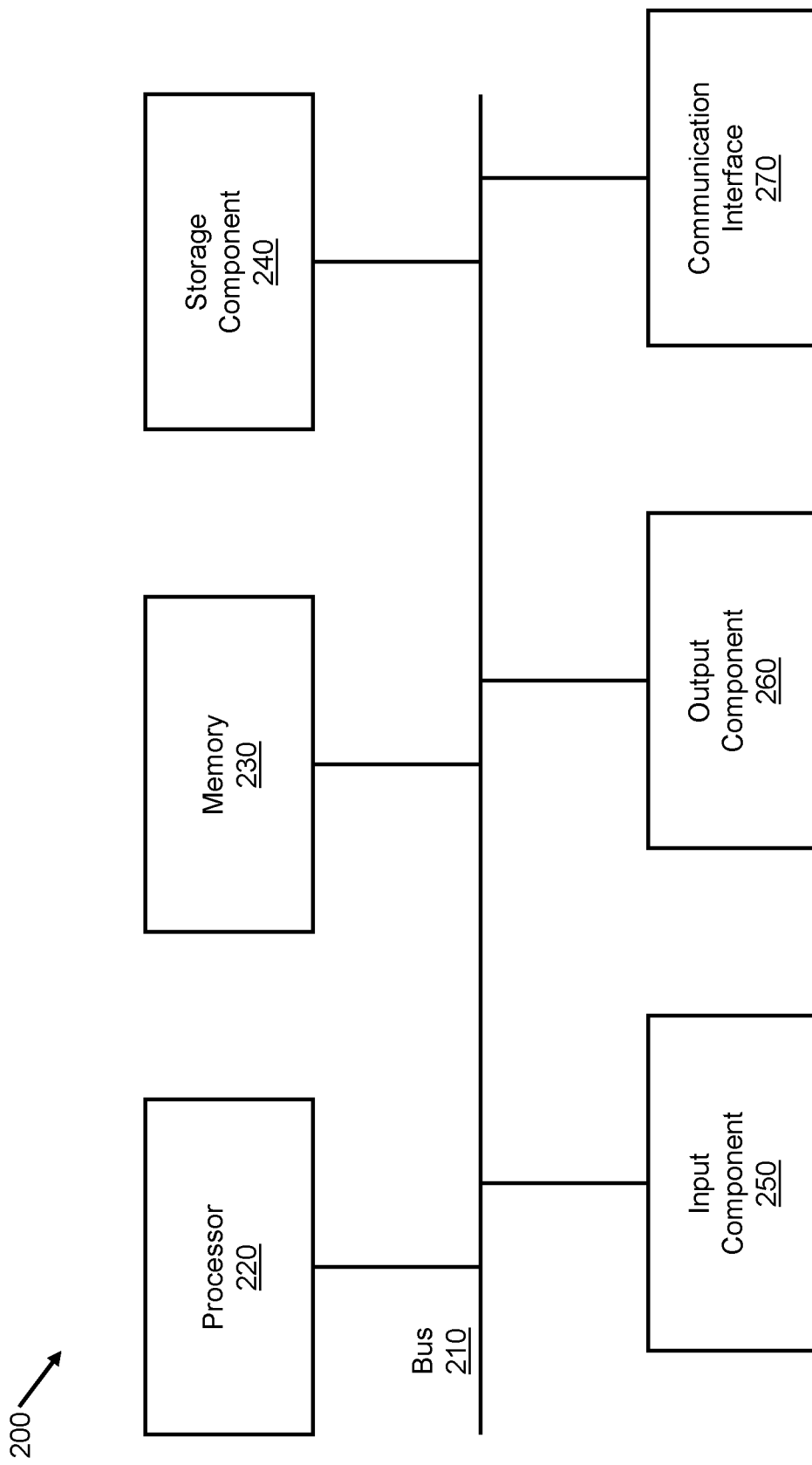
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 may include one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for adaptive neural image compression with arbitrary smooth quality control by meta-learning will now be described in detail.

This disclosure proposes a meta-NIC framework that supports arbitrary smooth bitrate control. A meta-learning mechanism is used to adaptively compute quality-adaptive weight parameters of an underlying NIC model based on a current input image and a target quality indicator, so that a single meta-NIC model instance can achieve image compression with arbitrary smooth target qualities.

Given an input image x of size (h,w,c), where h, w, c are a height, a width, and a number of channels, respectively, a target of a test stage of an NIC workflow can be described as follows. The input image x may be a regular image frame (t=1), a 4-dimensional video sequence comprising more than one image frame (t>1), and so on. Each image frame may be a color image (c=3), a gray-scale image (c=1), an rgb+depth image (c=4), etc. A compressed representation $\bar{y}$ that is compact for storage and transmission is computed. Then, based on the compressed representation $\bar{y}$, an output image $\bar{x}$ is reconstructed, and the reconstructed output image $\bar{x}$ may be similar to the original input image x. A distortion loss D (x,$\bar{x}$) is used to measure a reconstruction error, such as a peak signal-to-noise ratio (PSNR) or a structural similarity index measure (SSIM). A rate loss R($\bar{y}$) is computed to measure a bit consumption of the compressed representation $\bar{y}$. A trade-off hyperparameter λ is used to form a joint Rate-Distortion (R-D) loss:

$$L(x,\bar{x},\bar{y})=\lambda D(x,\bar{x})+R(\bar{y}) \quad (1).$$

Training with a large hyperparameter λ results in compression models with smaller distortion but more bit consumption, and vice versa. Traditionally, for each pre-defined hyperparameter λ, an NIC model instance will be trained, which will not work well for other values of the hyperparameter λ. Therefore, to achieve multiple bitrates of a compressed stream, traditional methods may require training and storing multiple model instances. Further, because it is difficult to train a model for every possible value of the hyperparameter λ in practice, traditional methods cannot achieve arbitrary smooth quality control such as arbitrary smooth bitrate control. Additionally, a model instance needs to be trained to optimize the loss measured by each type of metric, (e.g., for each distortion metric, i.e., PSNR, SSIM, a weighted combination of both, or other metrics) and traditional methods cannot achieve smooth quality metric control.

Figure 3A:
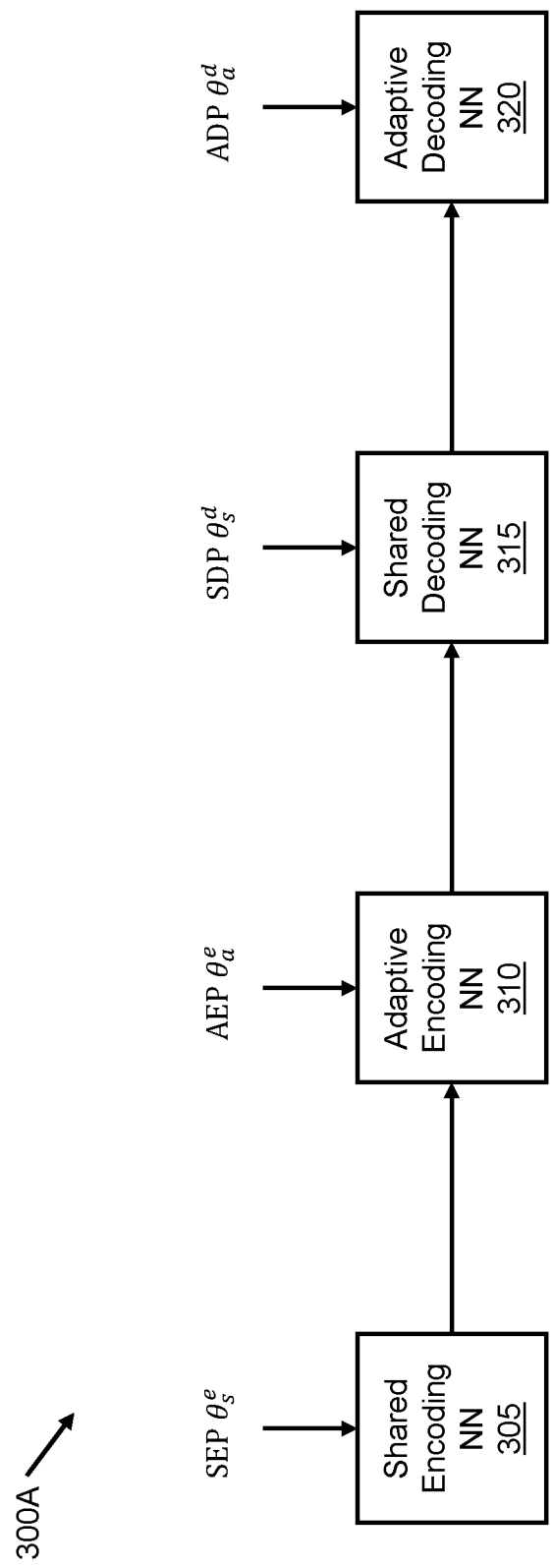
FIGS. 3A and 3B are block diagrams of meta-NIC architectures for adaptive neural image compression with smooth quality control by meta-learning, according to embodiments.
Figure 3B:
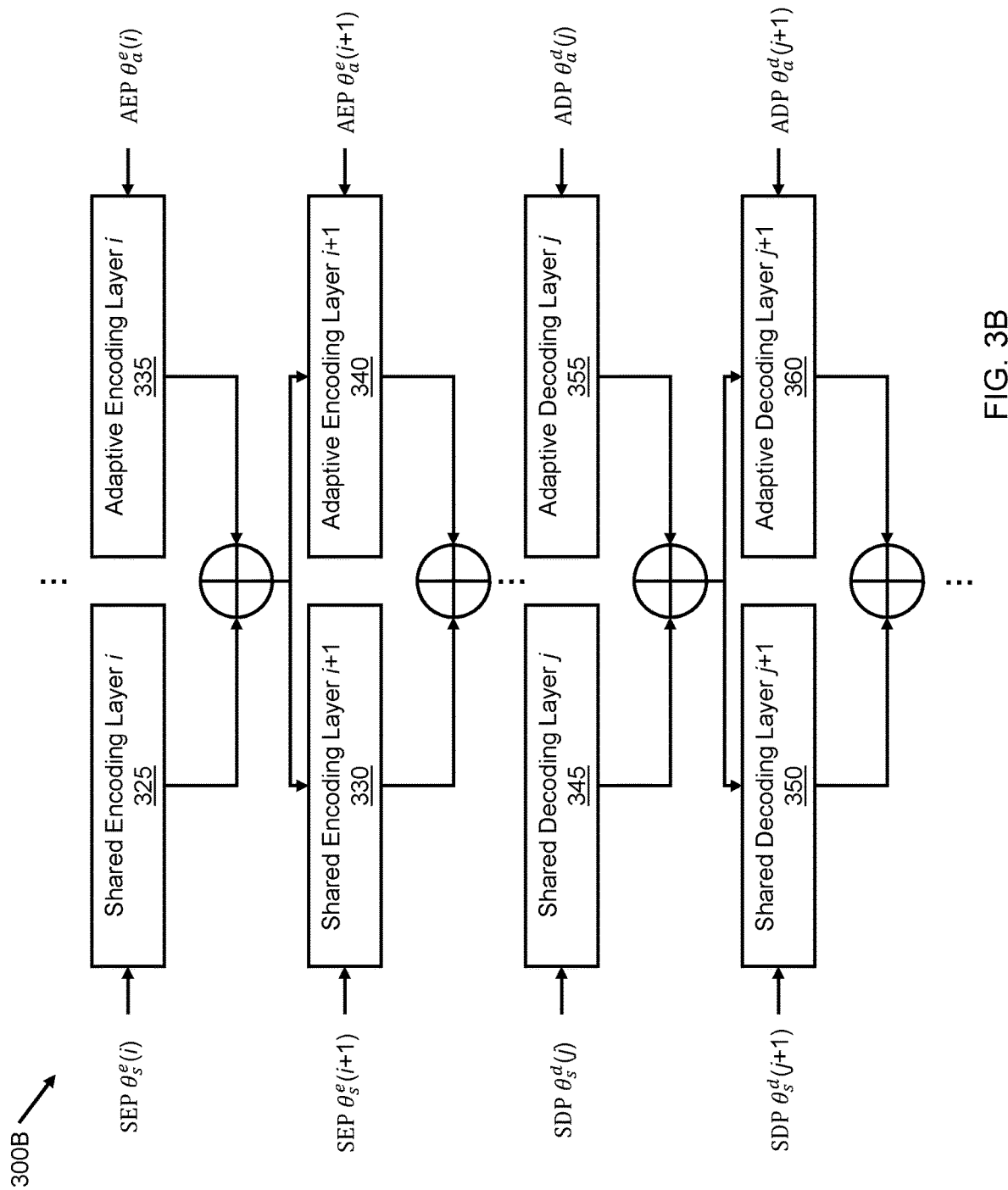

FIGS. 3A and 3B are block diagrams of meta-NIC architectures 300A and 300B for adaptive neural image compression with smooth quality control by meta-learning, according to embodiments.

As shown in FIG. 3A, the meta-NIC architecture 300A includes a shared encoding NN 305, an adaptive encoding NN 310, a shared decoding NN 315 and an adaptive decoding NN 320.

As shown in FIG. 3B, the meta-NIC architecture 300B includes shared encoding layers 325 and 330, adaptive encoding layers 335 and 340, shared decoding layers 345 and 350 and adaptive decoding layers 355 and 360.

In this disclosure, model parameters of an underlying NIC encoder and an underlying NIC decoder are separated into 4 parts $\theta_s^e$, $\theta_a^e$, $\theta_s^d$, $\theta_a^d$, denoting Shared Encoding Parameters (SEP), Adaptive Encoding Parameters (AEP), Shared Decoding Parameters (SDP), and Adaptive Decoding Parameters (ADP), respectively. FIGS. 3A and 3B show two embodiments of an NIC network architecture.

In FIG. 3A, SEP, SDP, AEP and ADP are separated individual NN modules, and these individual modules are connected to each other sequentially for network forward computation. Here, FIG. 3A shows a sequential order of connecting these individual NN modules. Other orders can be used here.

In FIG. 3B, a parameter split is within NN layers. Let $\theta_s^e(i)$, $\theta_a^e(i)$, $\theta_s^d(j)$, $\theta_a^d(j)$ denote SEP, AEP, SDP, and ADP for an i-th layer of an NIC encoder and a j-th layer of an NIC decoder, respectively. The network will compute inference outputs based on corresponding inputs for the SEP and AEP (or the SDP and ADP), respectively, and these outputs will be combined (e.g., by addition, concatenation, multiplication, etc.) and then sent to a next layer.

The embodiment of FIG. 3A can be seen as a case of FIG. 1B, in which layers in the shared encoding NN 305 $\theta_a^d(i)$ are empty, layers in the adaptive encoding NN 310 $\theta_s^e(i)$ are empty, layers in the shared decoding NN 315 $\theta_s^d(j)$ are empty, and layers in the adaptive decoding MN 320 $\theta_a^d(j)$ are empty. Therefore, in other embodiments, the network structures of FIGS. 3A and 3B can be combined, in which an NIC architecture includes both purely shared encoding/decoding layers and/or purely adaptive encoding/decoding layers, and mixed layers with partial shared encoding/decoding parameters and partial adaptive encoding/decoding parameters.

Figure 4A:
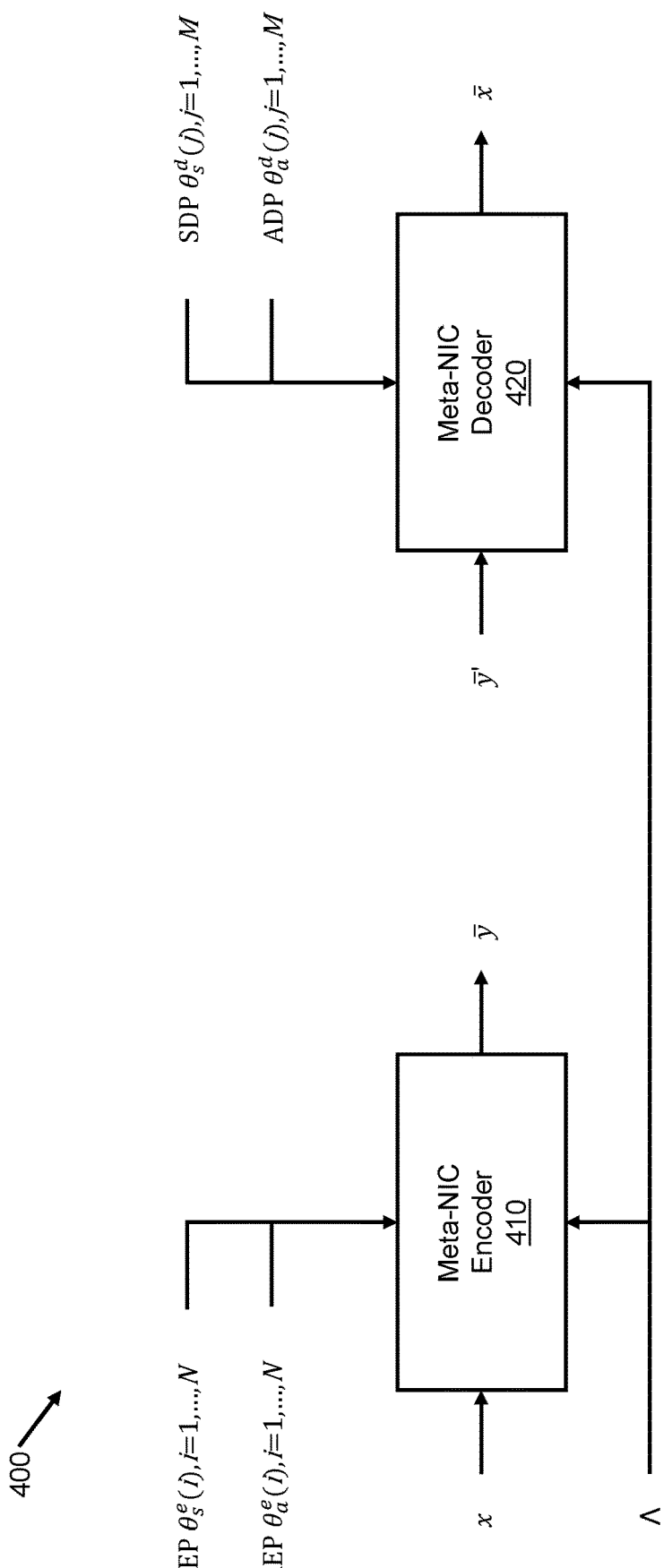
FIG. 4A is a block diagram of an apparatus for adaptive neural image compression with smooth quality control by meta-learning, according to embodiments.

FIG. 4A is a block diagram of an apparatus 400 for adaptive neural image compression with rate control by meta-learning, during a test stage, according to embodiments.

As shown in FIG. 4A, the apparatus 400 includes a meta-NIC encoder 410 and a meta-NIC decoder 420.

FIG. 4A shows an overall workflow of the test stage of a meta-NIC framework. Let $\theta_s^e(i)$ and $\theta_a^e(i)$ denote SEP and AEP for an i-th layer of the meta-NIC encoder 410, respectively. This is an example notation, because for a layer that is completely shared, $\theta_a^e(i)$ is empty. For a layer that is completely adaptive, $\theta_s^e(i)$ is empty. In other words, this notation can be used for both embodiments of FIGS. 3A and 3B.

Given an input image x, and given a target quality control parameter Λ, the meta-NIC encoder 410 computes a compressed representation $\bar{y}$. The target quality control parameter Λ indicates the target compression quality, including the target quality metric, the target bitrate, etc. For the target quality control parameter Λ, let q be a number of quality metrics $D_1(x,\bar{x}), \ldots D_q(x,\bar{x})$ (such as PSNR, SSIM, etc.), and the overall quality metric be generally represented as a weighted combination of the number of quality metrics:

$$D(x,\bar{x}) = \Sigma_{i=1}^q w_i D_i(x,\bar{x}) \quad (2)$$

Where weights $w_i \geq 0$. In some embodiments, the target quality control parameter Λ may be a single vector comprising of all the weights $w_i$ and the target trade-off hyperparameter λ: $\Lambda = [w_1, \ldots w_q, \lambda]$. When only a single quality metric $D_1(x,\bar{x})$ is being used, the $w_i = 1$ and $w_j = 0$, for any $i \neq j$. in embodiments where the above-mentioned is true, target quality control parameter Λ may be reduced to contain only the target trade-off hyperparameter λ: $\Lambda = \lambda$.

In the meta-NIC encoder 410, the input image x is passed through a meta-NIC encoding NN. Let f(i) and f(i+1) denote an input tensor and an output tensor of an i-th layer.

Figure 4B:
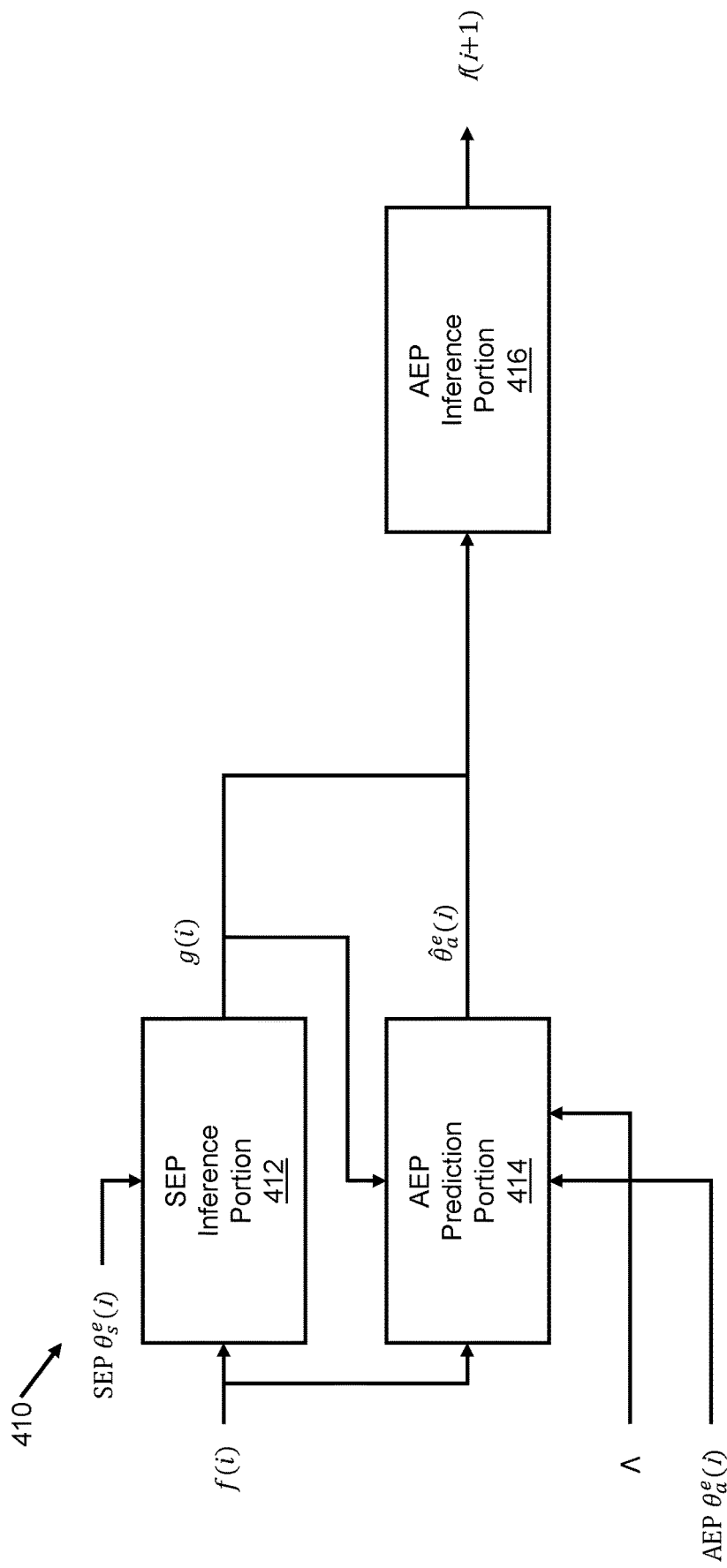
FIG. 4B is a block diagram of a meta-NIC encoder of the apparatus shown in FIG. 4A.

FIG. 4B is a block diagram of the meta-NIC encoder 410 of the apparatus 400 shown in FIG. 4A.

As shown in FIG. 4B, the meta-NIC encoder 410 includes an SEP inference portion 412, an AEP prediction portion 414 and an NEP inference portion 416.

FIG. 4B gives an example embodiment of an inference workflow of the meta-NIC encoder 410 for an i-th layer. Based on a current input f(i) and SEP $\theta_s^e(i)$, the SEP inference portion 412 computes a shared feature g(i) based on a shared inference function $G_i(f(i), \theta_s^e(i))$ that is modeled by a forward computation using the SEP in the i-th layer. Based on the current input f(i), the shared feature g(i), AEP $\theta_a^e(i)$ and a target quality control parameter Λ, the AEP prediction portion 414 computes estimated AEP $\hat{\theta}_a^e(i)$ for the i-th layer. The AEP prediction portion 414 may be an NN, e.g., including convolution and fully connected layers, which predict the updated estimated AEP $\hat{\theta}_a^e(i)$ based on the original AEP $\theta_a^e(i)$, the current input f(i), and the target quality control parameter Λ. In some embodiments, the current input f(i) is used as an input to the AEP prediction portion 414. In some other embodiments, the shared feature g(i) is used instead of the current input f(i). In other embodiments, an SEP loss can be computed based on the shared feature g(i), and a gradient of the loss is used as input to the AEP prediction portion 414. Based on the estimated AEP $\hat{\theta}_a^e(i)$ and the shared feature g(i), the AEP inference portion 416 computes an output tensor f(i+1) based on an AEP inference function $A_i(g(i), \hat{\theta}_a^e(i))$ that is modeled by the forward computation using the estimated AEP in the i-th layer.

Note that the workflow described in FIG. 4B is an example notation. For a layer that is completely shared with the AEP $\theta_a^e(i)$ being empty, AEP-related modules and f(i+1)=g(i) may be omitted. For a layer that is completely adaptive with the SEP $\theta_s^e(i)$ being empty, SEP-related modules and g(i)=f(i) may be omitted.

Assume there are a total of N layers for the meta-NIC encoder 410, an output of a last layer is a compressed representation $\bar{y}$, which is sent to the meta-NIC decoder 420 (e.g., after being further compressed into a compact bitstream by quantization and entropy encoding).

Referring again to FIG. 4A, on a decoder side, let $\theta_s^d(j)$ and $\theta_a^d(j)$ denote SDP and ADP for a j-th layer of the meta-NIC decoder 420, respectively. Similar to the meta-NIC encoder 410, this is an example notation, because for a layer that is completely shared, $\theta_a^d(j)$ is empty, and for a layer that is completely adaptive, $\theta_s^d(j)$ is empty.

On a decoder side, a recovered compressed representation $\bar{y}'$ is obtained from a bitstream sent from the meta-NIC encoder 410 by entropy decoding and dequantization. Based on the recovered compressed representation $\bar{y}'$ and the target quality control parameter Λ, the meta-NIC decoder 420 computes a reconstructed output image $\bar{x}$. In the meta-NIC decoder 420, the recovered compressed representation $\bar{y}'$ is passed through the meta-NIC decoding NN. Let f(j) and f(j+1) denote an input tensor and an output tensor of j-th layer.

Figure 4C:
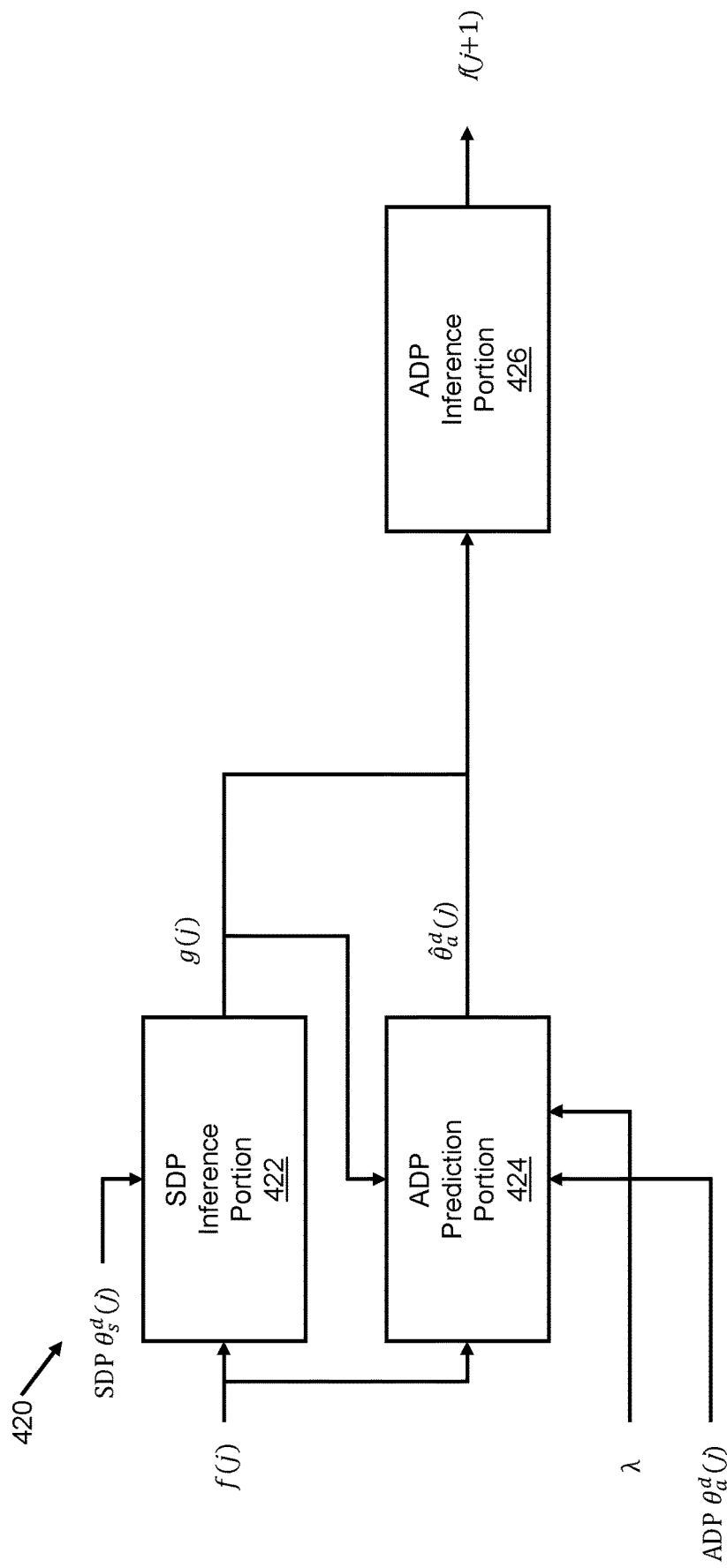
FIG. 4C is a block diagram of a meta-NIC decoder of the apparatus shown in FIG. 4A.

FIG. 4C is a block diagram of the meta-NIC decoder 420 of the apparatus 400 shown in FIG. 4A.

As shown in FIG. 4C, the meta-NIC decoder 420 includes an SDP inference portion 422, an ADP prediction portion 424 and an ADP inference portion 426.

FIG. 4C gives an example embodiment of an inference workflow of the meta-NIC decoder 420 for a j-th layer. Based on a current input f(j) and SDP $\theta_s^d(j)$, the SDP inference portion 422 computes a shared feature g(j) based on a shared inference function $G_j(f(j),\theta_s^d(j))$ that is modeled by a network forward computation using the SDP of the j-th layer. Based on the current input f(j), the shared feature g(j), ADP $\theta_a^d(j)$ and a target quality control parameter $\Lambda$, the ADP prediction portion 424 computes estimated ADP $\hat{\theta}_a^d(j)$ for the j-th layer. The ADP prediction portion 424 may be an NN, e.g., with convolution and fully connected layers, which predict the updated estimated $\hat{\theta}_a^d(j)$ based on the original ADP $\theta_a^d(i)$, the current input f(j), and the target quality control parameter $\Lambda$. In some embodiments, the current input f(j) is used as input to the ADP prediction portion 424. In some other embodiments, the shared feature g(j) is used instead of the current input f(j). In other embodiments, an SDP loss is computed based on the shared feature g(j), and a gradient of the loss is used as input to the ADP prediction portion 424. Based on the estimated ADP $\hat{\theta}_a^d(j)$ and the shared feature g(j), the ADP inference portion 426 computes an output, tensor f(j+1) based on an ADP inference function $A_j(g(j),\hat{\theta}_a^d(j))$ that is modeled by the network forward computation using estimated ADP in the j-th layer.

Note that the workflow described in FIG. 4C is an example notation. For a layer that is completely shared with ADP $\theta_a^d(j)$ being empty, ADP-related modules and f(j+1)=g(j) may be omitted. For a layer that is completely adaptive with SDP $\theta_s^d(j)$ being empty, SDP-related modules and g(j)=f(j) may be omitted.

Assume there are a total of M layers for the meta-NIC decoder 420, an output of a last layer is a reconstructed image output $\bar{x}$.

In some embodiments, the trade-off hyperparameter $\lambda$ is the same for encoder and decoder. In some other embodiments, the hyperparameter $\lambda$ can be different for the meta-NIC encoder 410 and the meta-NIC decoder 420. In such a case, the meta-NIC decoder 420 tries to adapt the compressed representation to a different target quality from an original encoding target quality.

Note that the meta-NIC framework allows an arbitrary smooth trade-off hyperparameter $\lambda$, and an arbitrary smooth combining weights $w_i$ for different quality metrics. The processing workflow described in FIG. 4C will compute the compressed representation and the reconstructed image to fit the arbitrary smooth target quality control parameter $\Lambda$.

In some embodiments, the target quality control parameter $\Lambda$ is the same for encoder and decoder. In some other embodiments, the target quality control parameter $\Lambda$ can be different for the meta-NIC encoder 410 and the meta-NIC decoder 420. In such a case, the meta-NIC decoder 420 tries to adapt the compressed representation to a different target quality from an original encoding target quality.

According to embodiments of the present disclosure, when the AEP prediction portion 424 and the ADP prediction portion 424 only perform prediction over a pre-defined set of trade-off hyperparameters with/without considering the input f(i) or f(j), and for a pre-defined set of combining weights (e.g., targeting a distortion metric $D_i(x,\bar{x})$ only with $w_i=1$ and $w_j=0$ for $i\neq j$) the meta-NIC model reduces to a multi-rate NIC model for the distortion metric $D_i(x,\bar{x})$ that uses one model instance to accommodate compression effects of multiple pre-defined bitrates. The meta-NIC model may reduce to another specific meta-NIC model for other metrics similarly.

Figure 5:
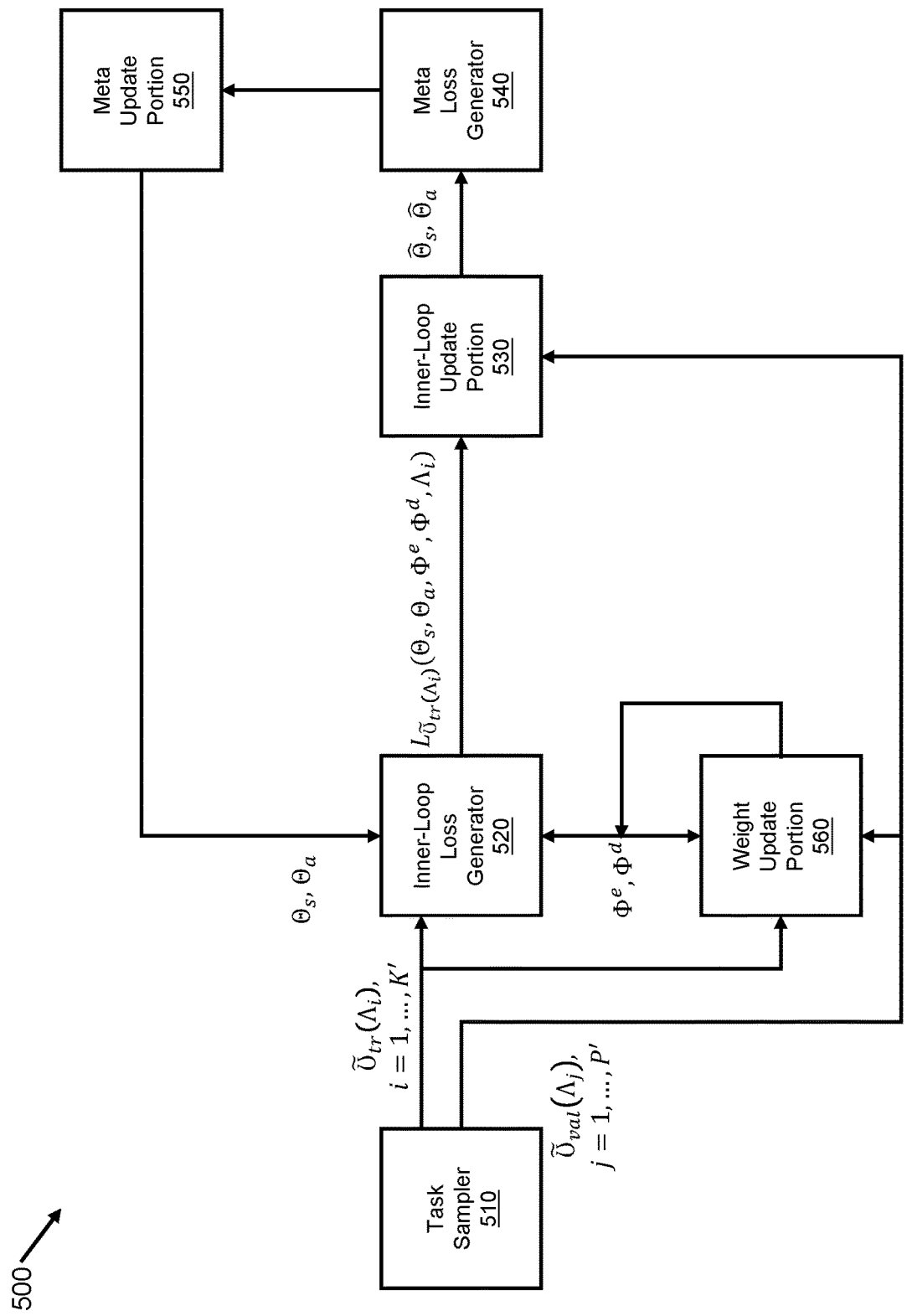
FIG. 5 is a block diagram of a training apparatus for adaptive neural image compression with smooth quality control by meta-learning, during a training stage, according to embodiments.

FIG. 5 is a block diagram of a training apparatus 500 for adaptive neural image compression with rate control by meta-learning, during a training stage, according to embodiments.

As shown in FIG. 5, the training apparatus 500 includes a task sampler 510, an inner-loop loss generator 520, an inner-loop update portion 530, a meta loss generator 540, a meta update portion 550 and a weight update portion 560.

A training process aims at learning SEP $\theta_s^e(i)$ and AEP $\theta_a^e(i)$, $i=1,\ldots,N$ for the meta-NIC encoder 410 of FIG. 4A and SDP $\theta_s^d(j)$ and ADP $\theta_a^d(j)$, $j=1,\ldots,M$ for the meta-NIC decoder 420 of FIG. 4A, as well as an AEP prediction NN (model parameters denoted as $\Phi^e$) and an ADP prediction NN (model parameters denoted as $\Phi^d$).

In embodiments, a Model-Agnostic Meta-Learning (MAML) mechanism is used for a training purpose. FIG. 5 gives an example workflow of a meta-training framework. Other meta-training algorithms can be used here.

For training, there is a set of training data $\upsilon_{tr}(\Lambda_i)$, $i=1,\ldots,K$, where each $\upsilon_{tr}(\Lambda_i)$ corresponds to a training target quality control parameter $\Lambda_i$, and there are K training quality control parameters (thus K training data sets) in total. For training, there may be a finite set of weight combinations. For each weight combination $w_1=a_1,\ldots w_q=a_q$, there may be a set of k trade-off hyperparameters $\lambda_i$. Therefore, training data $\upsilon_{tr}(\Lambda_i)$ is associated with each weight combination $w_1=a_1,\ldots w_q=a_q$ and trade-off hyperparameters $\lambda_i$, where the target quality control parameter $\Lambda_i$ specifies the values of the items in the quality control parameter $\Lambda$, $w_1=a_1,\ldots w_q=a_q$, $\lambda=\lambda_i$. In addition, there is a set of validation data $\upsilon_{val}(\lambda_j)$, $j=1,\ldots,P$, where each $\upsilon_{val}(\lambda_j)$ corresponds to a validation quality control parameter $\Lambda_j$, and there are P validation quality control parameter $\Lambda_j$ in total. The validation quality control parameter may include different values from the training set. The validation quality control parameter may also have same values as those from the training set.

An overall training goal is to learn a meta-NIC model so that it can be broadly applied to all (including training and future unseen) values of quality control parameter, corresponding to a broad smooth range of target compression qualities. The assumption being that an NIC task with a target quality control parameter is drawn from a task distribution $P(\Lambda)$. To achieve the training goal mentioned above, a loss for learning the meta-NIC model is minimized across all training data sets across all training quality control parameters.

Let $\Theta_s=\{\theta_s^e,\theta_s^d\}$ include all shared parameters in SEP and SDP, and let $\Theta_a=\{\theta_a^e,\theta_a^d\}$ include all adaptive parameters in AEP and ADP. The MAML training process may have an outer loop and an inner loop for gradient-based parameter updates. For each outer loop iteration, the task sampler 510 first samples a set of K' training quality control parameters (K'≤K). Then for each sampled training quality control parameter $\Lambda_i$, the task sampler 510 samples a set of training data $\tilde{\upsilon}_{tr}(\Lambda_i)$ from the set of training data $\upsilon_{tr}(\Lambda_i)$. Also, the task sampler 510 samples a set of P' (P'≤P) validation quality control parameters, and for each sampled validation quality control parameter $\Lambda_j$, samples a set of validation data $\tilde{\upsilon}_{val}(\Lambda_j)$ from the set of validation data $\upsilon_{val}(\Lambda_j)$. Then for each sampled datum $x\in\tilde{\upsilon}_{tr}(\Lambda_i)$, a meta-NIC forward computation is conducted based on current parameters $\Theta_s$, $\Theta_a$, $\Phi^e$ and $\Phi^d$, and the inner-loop loss generator 520 then computes an accumulated inner-loop loss $L_{\tilde{\upsilon}_{tr}(\Lambda_i)}(\Theta_s, \Theta_a, \Phi^e, \Phi^d, \Lambda_i)$:

$$L_{\tilde{D}_{tr}(\lambda_i)}(\Theta_s,\Theta_a,\Phi^e,\Phi^d,\Lambda_i)=\Sigma_{x\in\tilde{D}_{tr}(\lambda_i)}L(x,\Theta_s,\Theta_a,\Phi^e,\Phi^d,\Lambda_i) \quad (3).$$

The loss function $L(x, \Theta_s, \Theta_a, \Phi^e, \Phi^d, \Lambda_i)$ may include an R-D loss of Equation (1) and another regularization loss (e.g., an auxiliary loss of distinguishing an intermediate network output targeting different quality control parameters). Then, based on the inner-loop loss $L_{\tilde{\upsilon}_{tr}(\Lambda_i)}(\Theta_s, \Theta_a, \Phi^e, \Phi^d, \Lambda_i)$, given step sizes $a_{si}$ and $a_{ai}$ as quality control parameters/hyperparameters for $\Lambda_i$, the inner-loop update portion 530 computes an updated task-specific parameter update:

$$\hat{\Theta}_a = \Theta_a - \Sigma_{i=1}^{K'} \alpha_{ai} \nabla_{\Theta_a} L_{\tilde{\upsilon}_{tr}(\Lambda_i)}(\Theta_s, \Theta_a, \Phi^e, \Phi^d, \Lambda_i), \quad (4); \text{ and}$$

$$\hat{\Theta}_s = \Theta_s - \Sigma_{i=1}^{K'} \alpha_{si} \nabla_{\Theta_s} L_{\tilde{\upsilon}_{tr}(\Lambda_i)}(\Theta_s, \Theta_a, \Phi^e, \Phi^d, \Lambda_i) \quad (5).$$

Gradient $\nabla_{\Theta_a} L_{\tilde{\upsilon}_{tr}(\Lambda_i)}(\Theta_s, \Theta_a, \Phi^e, \Phi^d, \Lambda_i)$ and gradient $\nabla_{\Theta_s} L_{\tilde{\upsilon}_{tr}(\Lambda_i)}(\Theta_s, \Theta_a, \Phi^e, \Phi^d, \Lambda_i)$ of the accumulated inner-loop loss $L_{\tilde{\upsilon}_{tr}(\Lambda_i)}(\Theta_s, \Theta_a, \Phi^e, \Phi^d, \Lambda_i)$ may be used to compute an updated version of adaptive parameters $\hat{\Theta}_a$ and $\hat{\Theta}_s$, respectively.

Then, a meta loss generator 540 computes an outer meta objective or loss over all sampled validation quality control parameters:

$$L(\Theta_s, \Theta_a, \Phi^e, \Phi^d) = \Sigma_{j=1}^{P'} L_{\tilde{\upsilon}_{val}(\Lambda_j)}(\hat{\Theta}_s, \hat{\Theta}_a, \Phi^e, \Phi^e, \Lambda_j), \quad (6); \text{ and}$$

$$L_{\tilde{\upsilon}_{val}(\Lambda_j)}(\hat{\Theta}_s, \hat{\Theta}_a, \Phi^e, \Phi^d, \Lambda_j) = \Sigma_{x \in \tilde{\upsilon}_{val}(\Lambda_j)} L(x, \hat{\Theta}_s, \hat{\Theta}_a, \Phi^e, \Phi^d, \Lambda_j) \quad (7),$$

where $L(x, \hat{\Theta}_s, \hat{\Theta}_a, \Phi^s, \Phi^a, \Lambda_j)$ loss computed for an input x based on the meta-NIC forward computation using parameters $\hat{\Theta}_s, \hat{\Theta}_a, \Phi^s, \Phi^a$. Given step size $\beta_{aj}$ and $\beta_{sj}$ as hyperparameters for $\Lambda_j$, the meta update portion 550 updates the model parameters as:

$$\Theta_a = \Theta_a - \Sigma_{j=1}^{P'} \beta_{aj} \nabla_{\Theta_a} L_{\tilde{\upsilon}_{val}(\Lambda_j)}(\hat{\Theta}_s, \hat{\Theta}_a, \Phi^e, \Phi^d, \Lambda_j) \quad (8); \text{ and}$$

$$\Theta_s = \Theta_s - \Sigma_{j=1}^{P'} \beta_{sj} \nabla_{\Theta_s} L_{\tilde{\upsilon}_{val}(\Lambda_j)}(\hat{\Theta}_s, \hat{\Theta}_a, \Phi^e, \Phi^d, \Lambda_j) \quad (9).$$

In some embodiments, $\Theta_s$ may not be updated in the inner loop, i.e., $a_{si}=0$, $\hat{\Theta}_s = \Theta_s$. The non-updation helps to stabilize the training process.

As for parameters $\Phi^e$, $\Phi^d$ of the AEP Prediction NN and ADP prediction NN, the weight update portion 560 updates them in a regular training manner. That is, according to the training and validation data $\upsilon_{tr}(\Lambda_i)$, $i=1, \ldots, K$, $\upsilon_{val}(\Lambda_j)$, $j=1, \ldots, P$, based on the current parameters $\Theta_s, \Theta_a, \Phi^e, \Phi^d$, a loss $L(x, \Theta_s, \Theta_a, \Phi^e, \Phi^d, \Lambda_i)$ for all samples $x \in \upsilon_{tr}(\Lambda_i)$ and a loss $L(x, \Theta_s, \Theta_a, \Phi^e, \Phi^d, \Lambda_j)$ for all samples $x \in \upsilon_{val}(\Lambda_j)$ are computed. Gradients of all these losses can be accumulated (e.g., added up) to perform parameter updates over $\Phi^e$, $\Phi^d$ through back-propagation.

Embodiments of the present disclosure are not restricted to the above-mentioned optimization algorithm or loss functions for updating these model parameters. Any optimization algorithm or loss functions for updating these model parameters known in the art may be used.

For a case in which the AEP prediction portion 414 of FIG. 4B and the ADP prediction portion 424 of a meta-NIC model only perform prediction over a pre-defined set of training quality control parameters and/or a pre-defined set of metric combining weights, validation quality control parameters may be the same as the training ones. The same MAML training procedure may be used to train the above-mentioned reduced meta-NIC model (i.e., a multi-rate NIC model that uses one model instance to accommodate compression effects of multiple pre-defined bitrates).

Embodiments of the present disclosure allows for using only one meta-NIC model instance to achieve image compression with arbitrary smooth quality control by using meta-learning. The methods and apparatuses mentioned herein may be used for both multi-rate compression with a single model and smooth bitrate control. The embodiments described herein may be used for both multi-metric and multi-rate compression with a single model, smooth bitrate control, and smooth quality metric control. The embodiments provide a flexible framework that accommodates various underlying NIC models and meta-learning methods.

Figure 6:
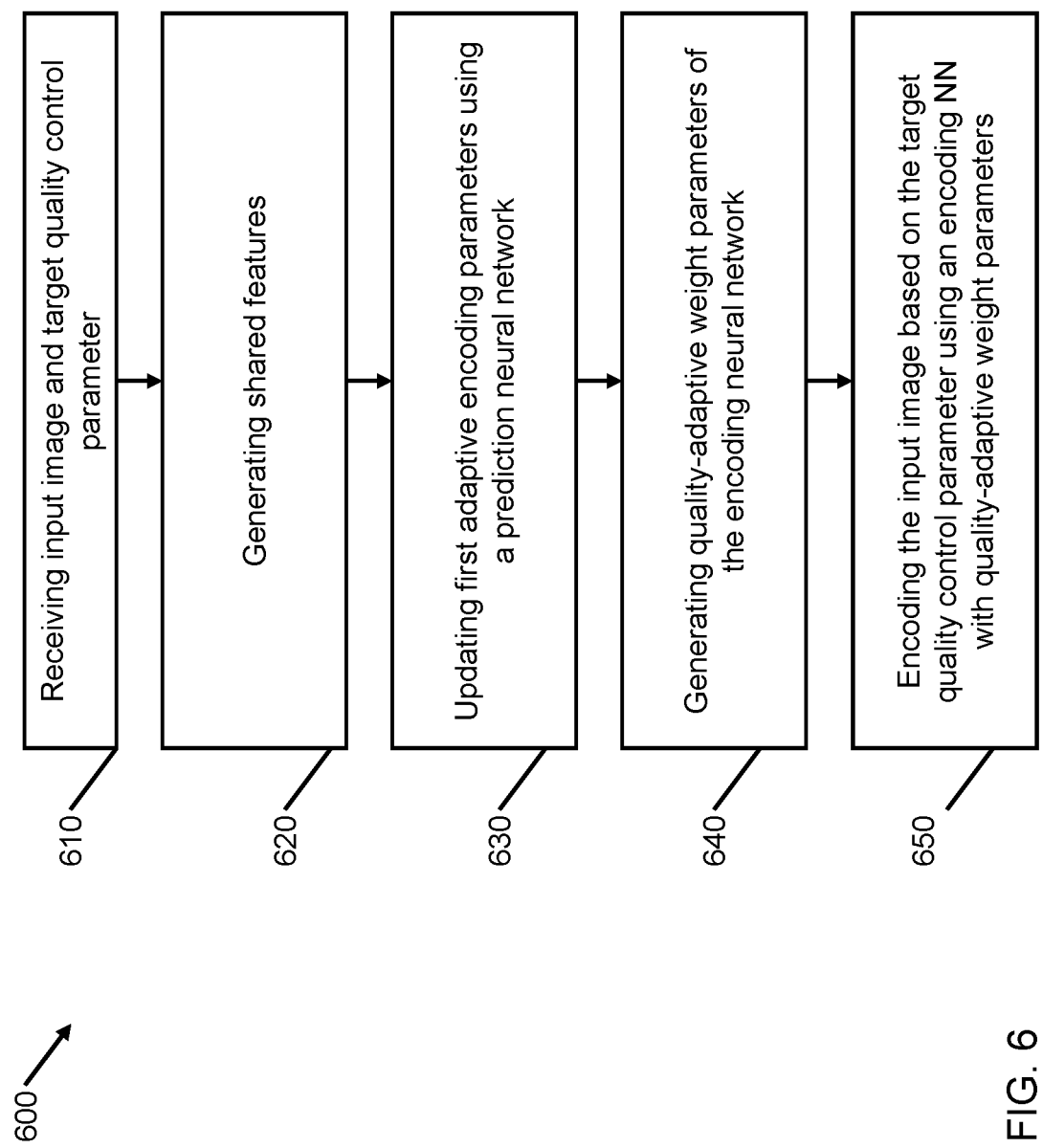
FIG. 6 is a flowchart of a method of adaptive neural image compression with smooth quality control by meta-learning, according to embodiments.

FIG. 6 is a flowchart of a method 600 of adaptive neural image compression with smooth quality control by meta-learning, according to embodiments.

As shown in FIG. 6, at operation 610 of method 600, an input image and a target quality control parameter may be received.

According to embodiments of the present disclosure, the target quality control parameter may include a plurality of weights and a target trade-off hyperparameter. As an example, the target quality control parameter $\Lambda$ may be a single vector and include of all the weights $w_i$ and the target trade-off hyperparameter $\lambda$, such that $\Lambda = [w_1, \ldots w_q, \lambda]$.

At operation 620, the method may include generating shared features, based on an intermediate input and first shared encoding parameters, using a shared inference function. As an example, the SEP inference portion 412 may generate shared features g(i) based on an intermediate input f(i) and first shared encoding parameters SEP $\theta_s^e(i)$ using a shared inference function $G_i(f(i), \theta_s^e(i))$.

At operation 630, the method may include updating first adaptive encoding parameters, based on the intermediate input, the shared features, the first adaptive encoding parameters, and the target quality control parameter, using a prediction neural network. As an example, the AEP prediction portion 414 may update first adaptive encoding parameters $\hat{\theta}_a^e(i)$ based on the first adaptive encoding parameters $\theta_a^e(i)$, the intermediate input f(i), the shared features g(i), and the target quality control parameter $\Lambda$.

In some embodiments, the training of the prediction neural network may include generating a first loss for training data corresponding to the target quality control parameter, and a second loss for validation data corresponding to the target quality control parameter, based on the target quality control parameter, the first shared encoding parameters, the first adaptive encoding parameters, first shared decoding parameters, first adaptive decoding parameters, and prediction parameters of the prediction neural network. The training may further include updating the prediction parameters, based on gradients of the generated first loss and the generated second loss. As an example, referring to FIG. 5, parameters $\Phi^e$, $\Phi^d$ of the AEP Prediction NN (a part of the AEP prediction portion 414) and ADP prediction NN (a part of the ADP prediction portion 424), are updated by the weight update portion 560 based on the the target quality control parameter $\Lambda$, the prediction parameters ($\Phi^e$, $\Phi^d$), first shared parameters $\Theta_s$, first adaptive parameters $\Theta_a$, a first loss $L(x, \Theta_s, \Theta_a, \Phi^e, \Phi^d, \Lambda_i)$ and a second loss $L(x, \Theta_s, \Theta_a, \Phi^e, \Phi^d, \Lambda_j)$. Gradients of all these losses can be accumulated (e.g., added up) to perform parameter updates over $\Phi^e$, $\Phi^d$ through back-propagation.

At operation 640, the method may include generating the quality-adaptive weight parameters of the encoding neural network, based on the shared features and the updated first adaptive encoding parameters. As an example, AEP inference portion 416 may generate the quality-adaptive weight parameters for the encoding neural network based on a combination of the shared features g(i) and the updated first adaptive encoding parameters $\hat{\theta}_a^e(i)$.

At operation 650, the method 600 may further include encoding the input image, based on the target quality control parameter, using an encoding neural network with quality-adaptive weight parameters, to generate a compressed representation, wherein the quality-adaptive weight parameters are computed using shared encoding parameters and adaptive encoding parameters. As an example, as an output of a last layer of the encoding neural network, the method may include encoding the input image to generate a compressed representation $\bar{y}$.

In some embodiments, encoding the input image may include generating the compressed representation based on the quality-adaptive weight parameters and the target quality control parameter.

In some embodiments, the method 600 may include performing operation 650 subsequent to operation 610. In such an example embodiment, the encoding of the input image may include operations 620-640. In some embodiments, the encoding of the input image to generate a compressed representation may include operations 615-630 being repeated for a plurality of layers of the meta-NIC model, such as the meta-NIC models implemented on apparatus 300A, 300B, and 410.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Figure 7:
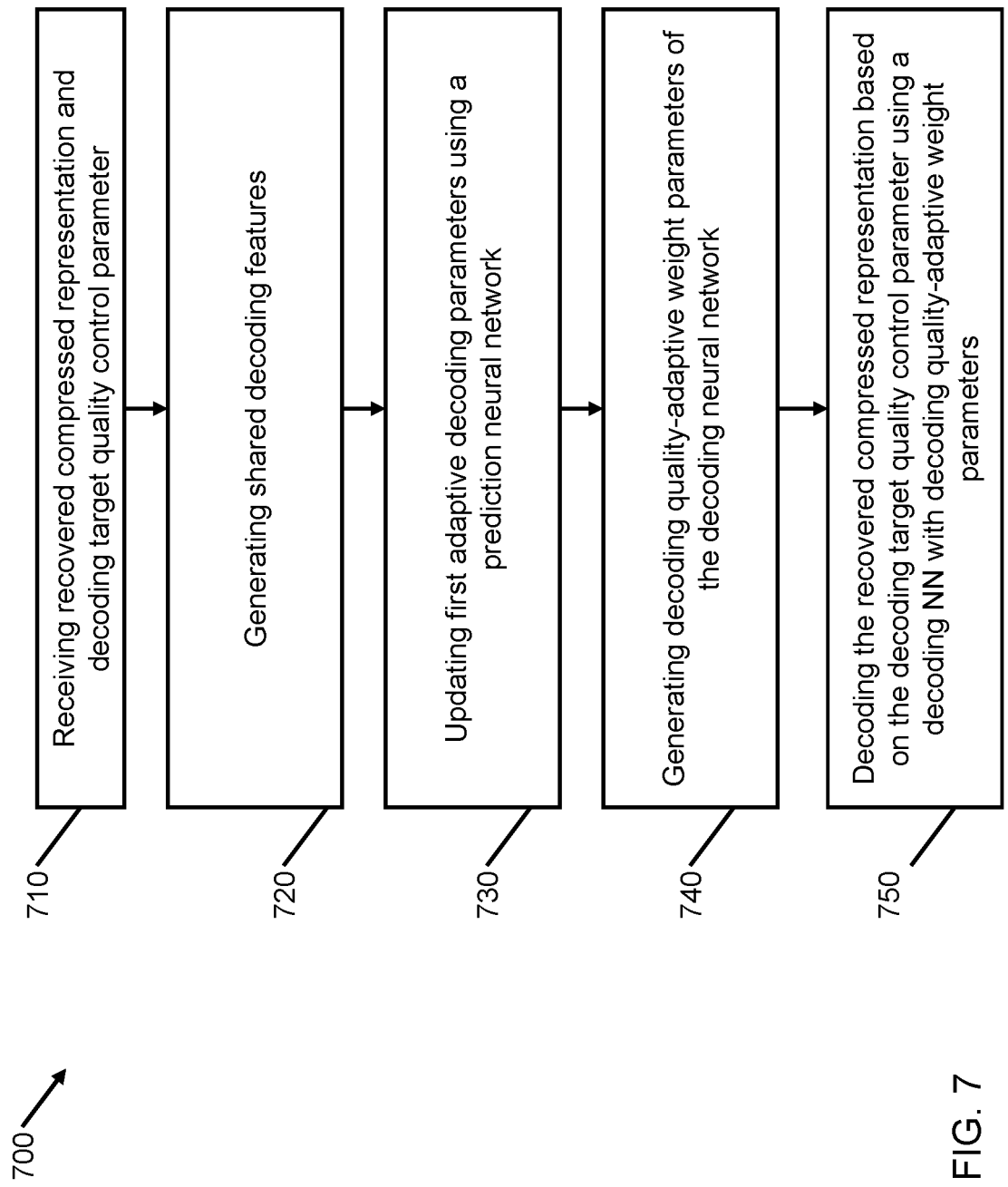
FIG. 7 is a flowchart of a method of adaptive neural image compression with smooth quality control by meta-learning, according to embodiments.

FIG. 7 is a flowchart of a method 700 of adaptive neural image compression with smooth quality control by meta-learning, according to embodiments.

As shown in FIG. 7, the method 700, at operation 710 includes receiving a recovered compressed representation and a decoding target quality control parameter.

In some embodiments, the decoding target quality control parameter comprises a plurality of weights and a target trade-off hyperparameter.

At operation 720, the method may include generating shared decoding features, based on an intermediate decoding input and first shared decoding parameters, using a shared decoding inference function. As an example, the SDP inference portion 422 may generate shared features g(j) based on an intermediate input f(j) and first shared decoding parameters SDP $\theta_s^d(j)$ using a shared inference function $G_j(f(j), \theta_s^j(j))$.

At operation 730, the method may include updating first adaptive decoding parameters, based on the intermediate decoding input, the shared decoding features, the first adaptive decoding parameters, and the decoding target quality control parameter, using a prediction neural network. As an example, the ADP prediction portion 424 may update first adaptive decoding parameters $\hat{\theta}_a^d(j)$ based on the first adaptive decoding parameters $\theta_a^d(j)$, the intermediate input f(j), the shared decoding features g(j), and the target quality control parameter Λ.

In some embodiments, the training of the prediction neural network may include generating a first loss for raining data corresponding to the target quality control parameter, and a second loss for validation data corresponding to the target quality control parameter, based on the target quality control parameter, the first shared encoding parameters, the first adaptive encoding parameters, the first shared decoding parameters, the first adaptive decoding parameters, and prediction parameters of the prediction neural network. The training may further include updating the prediction parameters, based on gradients of the generated first loss and the generated second loss. As an example, referring to FIG. 5, parameters $\Phi^e$, $\Phi^d$ of the AEP Prediction NN (a part of the AEP prediction portion 414) and ADP prediction NN (a part of the ADP prediction portion 424), are updated by the weight update portion 560 based on the the target quality control parameter Λ, the prediction parameters ($\Phi^e$, $\Phi^d$), first shared parameters $\Theta_s$, first adaptive parameters $\Theta_a$, a first loss L(x, $\Theta_s$, $\Theta_a$, $\Phi^e$, $\Phi^d$, $\Lambda_i$) and a second loss L(x, $\Theta_s$, $\Theta_a$, $\Phi^e$, $\Phi^d$, $\Lambda_j$). Gradients of all these losses can be accumulated (e.g., added up) to perform parameter updates over $\Phi^e$, $\Phi^d$ through back-propagation.

At operation 740, the method may include generating the decoding quality-adaptive weight parameters of the decoding neural network, based on the shared decoding features and the updated first adaptive decoding parameters. As an example, ADP inference portion 426 may generate the decoding quality-adaptive weight parameters for the encoding neural network based on a combination of the shared decoding features g(j) and the updated first adaptive encoding parameters $\hat{\theta}_a^d(j)$.

At operation 750, the method 700 may include decoding the received recovered compressed representation, based on the decoding target quality control parameter, using a decoding neural network with decoding quality-adaptive weight parameters, to reconstruct an output image, wherein the decoding quality-adaptive weight parameters are computed using shared decoding parameters and adaptive decoding parameters. As an example, as an output of a last layer of the decoding neural network, the method may include reconstructing the output image $\bar{x}$ based on the decoding target quality control parameter.

In some embodiments, decoding the received recovered compressed representation may include reconstructing the output image based on the decoding quality-adaptive weight parameters and the decoding target quality control parameter.

In some embodiments, the target quality control parameter of method 600 and the decoding target quality control parameter of method 700 may be different. Therefore, image properties of the compressed representation may be different from image properties of the reconstructed output image.

According to embodiments of the present disclosure, the training of the encoding and decoding neural networks in methods 600 and 700 respectively may include generating an inner-loop loss for training data corresponding to the target quality control parameter, based on the target quality control parameter, the first shared encoding parameters, the first adaptive encoding parameters, the first shared decoding parameters, and the first adaptive decoding parameters; followed by first updating the first shared encoding parameters, the first adaptive encoding parameters, the first shared decoding parameters and the first adaptive decoding parameters, based on gradients of the generated inner-loop loss. The training may further include generating a meta loss for validation data corresponding to the target quality control parameter, based on the target quality control parameter, the first updated first shared encoding parameters, the first updated first adaptive encoding parameters, the first updated first shared decoding parameters, and the first updated first adaptive decoding parameters; followed by second updating the first updated first shared encoding parameters, the first updated first adaptive encoding parameters, the first updated first shared decoding parameters, and the first updated first adaptive decoding parameters, based on gradients of the generated meta loss. As an example, referring to FIG. 5, inner loop loss generator 520 may generate the inner-loop loss associated with training data which is then updated by the inner-loop update portion 530, and meta loss generator 540 may generate a meta loss for validation data which is then updated by the meta update portion 550.

Although FIG. 7 shows example blocks of the method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for adaptive neural image compression with smooth quality control by meta-learning, the method being performed by at least one processor, the method comprising:
    receiving an input image and a target quality control parameter;
    generating quality-adaptive weight parameters of an encoding neural network using shared encoding parameters and adaptive encoding parameters, the generating comprising:
        generating shared features, based on an intermediate input and the shared encoding parameters, using a shared inference function;
        updating the adaptive encoding parameters, based on the intermediate input, the shared features, the adaptive encoding parameters, and the target quality control parameter, using a prediction neural network; and
        generating the quality-adaptive weight parameters of the encoding neural network, based on the shared features and the updated adaptive encoding parameters; and
    encoding the input image, based on the target quality control parameter, using the encoding neural network with the quality-adaptive weight parameters, to generate a compressed representation.

2. The method of claim 1, wherein the encoding the input image comprises generating the compressed representation based on the quality-adaptive weight parameters and the target quality control parameter.

3. The method of claim 1, wherein the target quality control parameter comprises a plurality of weights and a target trade-off hyperparameter.

4. The method of claim 1, further comprising:
    receiving a recovered compressed representation and a decoding target quality control parameter;
    generating decoding quality-adaptive weight parameters of a decoding neural network using shared decoding parameters and adaptive decoding parameters; and
    decoding the received recovered compressed representation, based on the decoding target quality control parameter, using the decoding neural network with the decoding quality-adaptive weight parameters, to reconstruct an output image.

5. The method of claim 4, wherein generating the decoding quality-adaptive weight parameters of the decoding neural network comprises:
    generating shared decoding features, based on an intermediate decoding input and the shared decoding parameters, using a shared decoding inference function;
    updating the adaptive decoding parameters, based on the intermediate decoding input, the shared decoding features, the adaptive decoding parameters, and the decoding target quality control parameter, using a prediction neural network; and
    generating the decoding quality-adaptive weight parameters of the decoding neural network, based on the shared decoding features and the updated adaptive decoding parameters.

6. The method of claim 4, wherein the target quality control parameter and the decoding target quality control parameter are different, and wherein image properties of the compressed representation are different from image properties of the reconstructed output image.

7. The method of claim 1, wherein the prediction neural network is trained by:
    generating a first loss for training data corresponding to the target quality control parameter, and a second loss for validation data corresponding to the target quality control parameter, based on the target quality control parameter, the first shared encoding parameters, the first adaptive encoding parameters, first shared decoding parameters, first adaptive decoding parameters, and prediction parameters of the prediction neural network; and updating the prediction parameters, based on gradients of the generated first loss and the generated second loss.

8. The method of claim 1, wherein the encoding neural network is trained by:
generating an inner-loop loss for training data corresponding to the target quality control parameter, based on the target quality control parameter, the shared encoding parameters, the adaptive encoding parameters, shared decoding parameters, and adaptive decoding parameters;
first updating the shared encoding parameters, the adaptive encoding parameters, the shared decoding parameters and the adaptive decoding parameters, based on gradients of the generated inner-loop loss;
generating a meta loss for validation data corresponding to the target quality control parameter, based on the target quality control parameter, the first updated shared encoding parameters, the first updated adaptive encoding parameters, first updated shared decoding parameters, and first updated adaptive decoding parameters; and
subsequent to the first updating, updating the first updated shared encoding parameters, the first updated adaptive encoding parameters, the first updated shared decoding parameters, and the first updated adaptive decoding parameters, based on gradients of the generated meta loss.

9. An apparatus comprising:
at least one memory configured to store program code; and
at least one processor configured to read the program code and operate as instructed by the program code, the program code comprising:
first receiving code configured to cause the at least one processor to receive an input image and a target quality control parameter;
quality-adaptive weight parameter generating code configured to cause the at least one processor to generate quality-adaptive weight parameters of an encoding neural network using shared encoding parameters and adaptive encoding parameters, the quality-adaptive weight parameter generating code comprising:
first generating code configured to cause the at least one processor to generate shared features, based on an intermediate input and the shared encoding parameters, using a shared inference function;
first updating code configured to cause the at least one processor to update the adaptive encoding parameters, based on the intermediate input, the shared features, the adaptive encoding parameters, and the target quality control parameter, using a prediction neural network; and
second generating code configured to cause the at least one processor to generate the quality-adaptive weight parameters of the encoding neural network, based on the shared features and the updated adaptive encoding parameters; and
first encoding code configured to cause the at least one processor to encode the input image, based on the target quality control parameter, using the encoding neural network with the quality-adaptive weight parameters, to generate a compressed representation.

10. The apparatus of claim 9, wherein the first encoding code further comprises third generating code configured to cause the at least one processor to generate the compressed representation based on the quality-adaptive weight parameters and the target quality control parameter.

11. The apparatus of claim 9, the program code further comprising:
second receiving code configured to cause the at least one processor to receive a recovered compressed representation and a decoding target quality control parameter;
decoding quality-adaptive weight parameter generating code configured to cause the at least one processor to generate decoding quality-adaptive weight parameters of a decoding neural network using shared decoding parameters and adaptive decoding parameters; and
first decoding code configured to cause the at least one processor to decode the received recovered compressed representation, based on the decoding target quality control parameter, using the decoding neural network with the decoding quality-adaptive weight parameters, to reconstruct an output image.

12. The apparatus of claim 11, wherein the program code further comprises:
fourth generating code configured to cause the at least one processor to generate shared decoding features, based on an intermediate decoding input and the shared decoding parameters, using a shared decoding inference function;
second updating code configured to cause the at least one processor to update the adaptive decoding parameters, based on the intermediate decoding input, the shared decoding features, the adaptive decoding parameters, and the decoding target quality control parameter, using a prediction neural network; and
fifth generating code configured to cause the at least one processor to generate the decoding quality-adaptive weight parameters of the decoding neural network, based on the shared decoding features and the updated adaptive decoding parameters.

13. The apparatus of claim 12, wherein the program code further comprises:
inner-loop loss generating code configured to cause the at least one processor to generate an inner-loop loss for training data corresponding to the decoding target quality control parameter, based on the decoding target quality control parameter, the shared encoding parameters, the adaptive encoding parameters, the first shared decoding parameters, and the first adaptive decoding parameters;
inner-loop loss updating code configured to cause the at least one processor to update the first shared encoding parameters, the first adaptive encoding parameters, the first shared decoding parameters, and the first adaptive decoding parameters, based on gradients of the generated inner-loop loss;
meta loss generating code configured to cause the at least one processor to generate a meta loss for validation data corresponding to the decoding target quality control parameter, based on the decoding target quality control parameter, the updated shared encoding parameters, the updated adaptive encoding parameters, the updated shared decoding parameters, and the updated adaptive decoding parameters; and
meta loss updating code configured to cause the at least one processor to update the updated shared encoding parameters, the updated adaptive encoding parameters, the updated shared decoding parameters, and the updated adaptive decoding parameters, based on gradients of the generated meta loss.

14. The apparatus of claim 11, wherein the target quality control parameter and the decoding target quality control parameter are different, and wherein image properties of the compressed representation are different from image properties of the reconstructed output image.

15. The apparatus of claim 9, wherein the program code further comprises:
    first computing code configured to cause the at least one processor to compute a first loss for training data corresponding to the target quality control parameter, and a second loss for validation data corresponding to the target quality control parameter, based on the target quality control parameter, the first shared encoding parameters, the first adaptive encoding parameters, first shared decoding parameters, first adaptive decoding parameters, and prediction parameters of the prediction neural network; and
    prediction updating code configured to cause the at least one processor to update the prediction parameters, based on gradients of the generated first loss and the generated second loss.

16. A non-transitory computer-readable medium storing instructions that, when executed by at least one processor, cause the at least one processor to:
    receive an input image and a target quality control parameter;
    generate quality-adaptive weight parameters of an encoding neural network using shared encoding parameters and adaptive encoding parameters, the generating of the quality-adaptive weight parameters comprises:
        generating shared features, based on an intermediate input and the shared encoding parameters, using a shared inference function;
        updating the adaptive encoding parameters, based on the intermediate input, the shared features, the adaptive encoding parameters, and the target quality control parameter, using a prediction neural network; and
        generating the quality-adaptive weight parameters of the encoding neural network, based on the shared features and the updated adaptive encoding parameters; and
    encode the input image, based on the target quality control parameter, using the encoding neural network with the quality-adaptive weight parameters, to generate a compressed representation.

17. The non-transitory computer-readable medium of claim 16, further storing instructions that cause the at least one processor to:
    receive a recovered compressed representation and a decoding target quality control parameter;
    generate decoding quality-adaptive weight parameters of a decoding neural network using shared decoding parameters and adaptive decoding parameters; and
    decode the received recovered compressed representation, based on the decoding target quality control parameter, using the decoding neural network with the decoding quality-adaptive weight parameters, to reconstruct an output image.

* * * * *